(12) United States Patent
Day et al.

(10) Patent No.: US 8,214,808 B2
(45) Date of Patent: Jul. 3, 2012

(54) SYSTEM AND METHOD FOR SPECULATIVE THREAD ASSIST IN A HETEROGENEOUS PROCESSING ENVIRONMENT

(75) Inventors: Michael Norman Day, Round Rock, TX (US); Michael Karl Gschwind, Chappaqua, NY (US); John Kevin Patrick O'Brien, South Salem, NY (US); Kathryn O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 11/745,018

(22) Filed: May 7, 2007

(65) Prior Publication Data

US 2008/0282064 A1     Nov. 13, 2008

(51) Int. Cl.
*G06F 9/45*     (2006.01)
(52) U.S. Cl. .......... 717/140; 717/148; 717/149; 712/22; 712/32; 712/203
(58) Field of Classification Search .......... 717/136–161, 717/168–178; 712/22, 33, 203
See application file for complete search history.

(56) References Cited

U.S. PATENT DOCUMENTS

| | | | |
|---|---|---|---|
| 6,049,668 A * | 4/2000 | Smith et al. | 717/138 |
| 6,928,645 B2 * | 8/2005 | Wang et al. | 718/102 |
| 7,360,067 B2 * | 4/2008 | Arimilli et al. | 712/225 |
| 7,818,724 B2 * | 10/2010 | Suzuoki | 717/136 |
| 2004/0044880 A1 * | 3/2004 | Altman et al. | 712/209 |
| 2004/0083462 A1 * | 4/2004 | Gschwind et al. | 717/140 |
| 2004/0107321 A1 * | 6/2004 | Altman et al. | 711/147 |

OTHER PUBLICATIONS

Khokhar, A.A.; Prasanna, V.K.; Shaaban, M.E.; Wang, C.-L.; , "Heterogeneous computing: challenges and opportunities," Computer , vol. 26, No. 6, pp. 18-27, Jun. 1993 doi: 10.1109/2.214439 URL: http://ieeexplore.ieee.org/stamp/stamp.jsp?tp=&arnumber=214439 &isnumber=5594.*

Panda, P.R.; Dutt, N.D.; Nicolau, A.; , "Efficient utilization of scratch-pad memory in embedded processor applications," European Design and Test Conference, 1997. ED&TC 97. Proceedings , vol., No., pp. 7-11, Mar. 17-20, 1997 doi: 10.1109/EDTC.1997.582323 URL: http://ieeexplore.ieee.org/stamp/stamp.jsp?tp= &arnumber=582323&isnumber=12625.*

\* cited by examiner

*Primary Examiner* — Wei Zhen
*Assistant Examiner* — Satish Rampuria
(74) *Attorney, Agent, or Firm* — VanLeeuwen & VanLeeuwen; Matthew B. Talpis (57) ABSTRACT

A system and method for speculative assistance to a thread in a heterogeneous processing environment is provided. A first set of instructions is identified in a source code representation (e.g., a source code file) that is suitable for speculative execution. The identified set of instructions are analyzed to determine the processing requirements. Based on the analysis, a processor type is identified that will be used to execute the identified first set of instructions based. The processor type is selected from more than one processor types that are included in the heterogeneous processing environment. The heterogeneous processing environment includes more than one heterogeneous processing cores in a single silicon substrate. The various processing cores can utilize different instruction set architectures (ISAs). An object code representation is then generated for the identified first set of instructions with the object code representation being adapted to execute on the determined type of processor.

20 Claims, 8 Drawing Sheets

SYSTEM AND METHOD FOR SPECULATIVE THREAD ASSIST IN A HETEROGENEOUS PROCESSING ENVIRONMENT

BACKGROUND OF THE INVENTION

1. Technical Field

The present invention relates in general to a system and method for speculatively assisting a thread running in a heterogeneous processing environment. More particularly, the present invention relates to a system and method that identifies instructions that can be speculatively performed during compilation and generates code that will execute on dissimilar processor cores.

2. Description of the Related Art

In a single-threaded software application running on one processor of a heterogeneous multi-core chip, the performance of the software application is limited by stalls that occur when requested elements are not at the highest levels of the memory hierarchy (e.g., a cache, an explicitly managed memory "scratchpad," etc.). As the name implies, a multi-core chip is a single chip with multiple processing cores where the processing cores are able to use different instruction set architectures (ISAs) while still sharing a common memory. An ISA includes a specification of the set of opcodes (machine language), the native commands implemented by a particular CPU design.

In addition, performance of the single-threaded software application is also reduced because of limited hardware resources and the requirements for the appearance of sequential execution. In a system utilizing the heterogeneous multi-core chip, certain processors (i.e., "cores") may have facilities not found on other processors. For example, some types of processors may have the ability to perform memory-to-memory moves, scatter/gather, or perform single instruction multiple data (SIMD) operations that may be particularly useful in assisting the execution of the single-threaded application.

Moreover, in a heterogeneous system it may be desirable to execute the single-threaded application in the shortest possible time. However, in a traditional system, most of the processor resources are unused because, by definition, a single-threaded application executes on a single core.

What is needed, therefore, is a system and method that speculatively uses resources found in the heterogeneous processing environment in order to assist the software application. What is further needed is a system, method, and program product that execute on more than one type of processors that use different ISAs in order to take advantage of the facilities provided by the various processors in a heterogeneous processing environment.

SUMMARY

It has been discovered that the aforementioned challenges are resolved using a system, method, and program product that provide speculative assistance to a thread in a heterogeneous processing environment. A first set of instructions is identified in a source code representation (e.g., a source code file) that is suitable for speculative execution. The identified set of instructions are analyzed to determine the processing requirements. Based on the analysis, a processor type is identified that will be used to execute the identified first set of instructions based. The processor type is selected from more than one processor types that are included in the heterogeneous processing environment. The heterogeneous processing environment includes more than one heterogeneous processing cores in a single silicon substrate. The various processing cores can utilize different instruction set architectures (ISAs). An object code representation is then generated for the identified first set of instructions with the object code representation being adapted to execute on the determined type of processor.

In a further embodiment, a second set of instructions is identified in the source code where the second set of instructions are not suitable for speculative execution, but the second set of instructions are delinquent code, such as code that causes a stall condition while the code waits for memory to load. In this further embodiment, a third set of instructions that is needed to prevent a stall of the identified second set of instructions is identified. The processing requirements of the identified third set of instructions is analyzed and a processor type that will be used to execute the third set of instructions is identified based on the analysis. Object code is generated corresponding to the third set of instructions, where the generated object code is adapted to execute on the determined processor type. In an alternative embodiment, the second object code representation is included in a main object code representation that corresponds to the main processing thread and instructions are inserted in the main object code representation that execute the third object code representation before the second set of instructions are encountered. The processor type that executes the main object code representation can be different than the processor type that executes the second object code representation.

In one embodiment, the source code is compiled into a first executable representation that is used to profile the program. Profiling of memory stalls is enabled in the first executable representation. The first executable representation is executed after profiling has been enabled and resultant data is stored and analyzed in order to identify at least one delinquent load instruction. An instruction profile is generated and stored to handle the delinquent load instruction. In a related embodiment, the source code is compiled again and the instruction profile is matched against instruction sets translated from source lines included in the source code. When a match is found, the first set of instructions is identified that leads to one of the instruction sets that matched the instruction profile (e.g., a set of instructions with a delinquent load instruction). A second thread of instructions is generated that includes a second set of instructions that perform functions of the identified first set of instructions, and instructions are inserted in the thread at a position before the matched sets of instructions with the inserted instructions executes the generated second thread. In this manner, the data needed by the instructions that experienced the delinquent (stall) condition are pre-computed so that the stall condition can be avoided. The first and second threads can execute on different processing cores that are included in the heterogeneous processing environment with the different processing cores using different instruction set architectures (ISAs).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
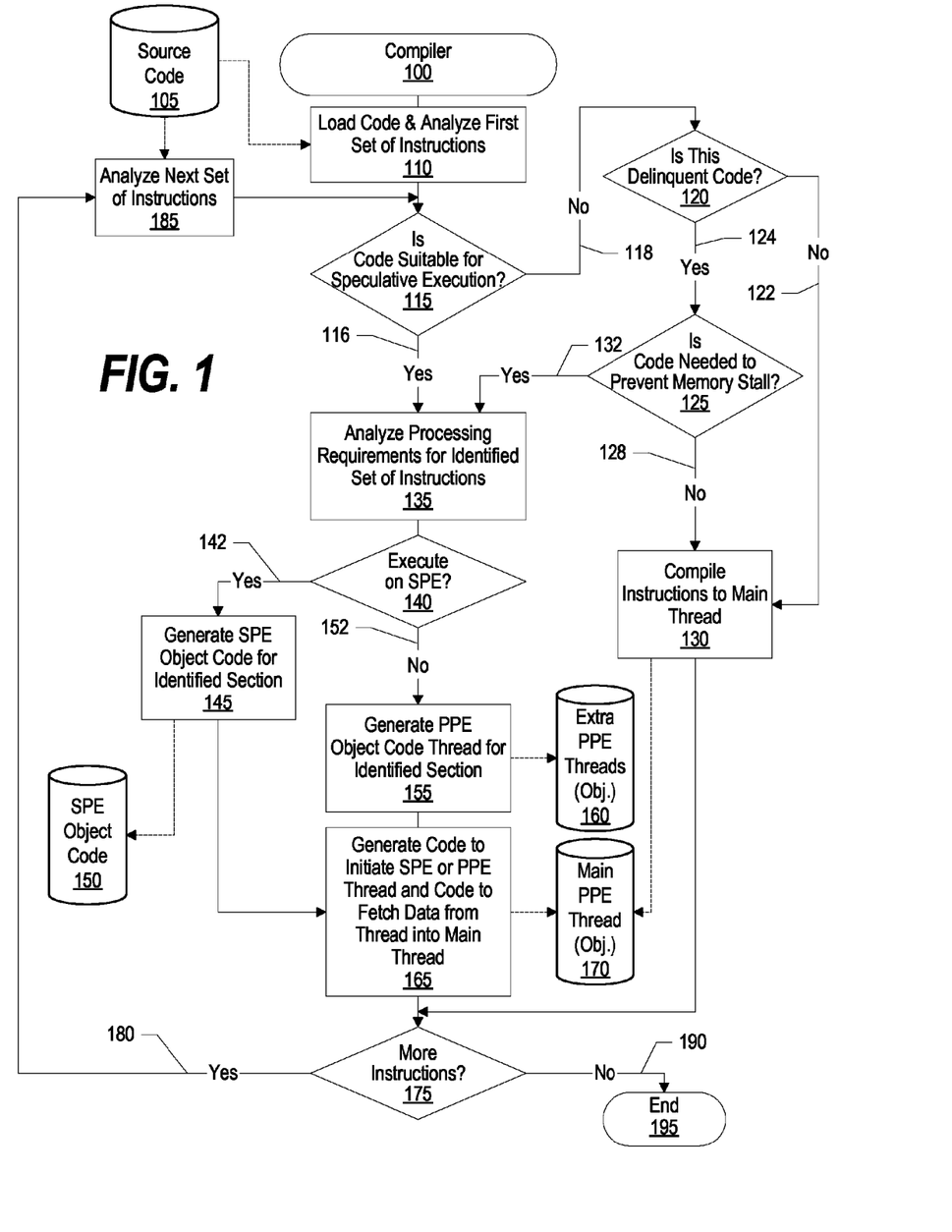
FIG. 1 is a flowchart showing steps taken by a compiler to compile source code with consideration for speculatively executing one or more sets of instructions on a different processor type selected from a multi-core processor.

FIG. 1 is a flowchart showing steps taken by a compiler to compile source code with consideration for speculatively executing one or more sets of instructions on a different processor type selected from a multi-core processor. Compiler processing commences at 100 whereupon, at step 110, the compiler loads source code 105 and analyzes the first set of instructions included in the source code. A determination is made as to whether the first set of instructions is suitable for speculative execution (decision 115). For example, in a branching situation, results used along one or both branches (e.g., results needed along the path when the condition is "true" and results needed along the path when the condition is "false" might be able to be computed ahead of time. In this manner, the branch and subsequent instructions can be performed faster. If the first set of instructions is suitable for speculative execution, decision 115 branches to "yes" branch 116 whereupon, at step 135, the processing requirements corresponding to the first set of instructions is analyzed in order to determine what type of processing core should execute the set of instructions.

Returning to decision 115, if the first set of instructions is not suitable for speculative execution, then decision 115 branches to "no" branch 118 whereupon, another determination is made as to whether the set of instructions is "delinquent code" (decision 120). Delinquent code is code that has been found to cause memory stalls. In other words, delinquent code is code that uses memory elements that are not at the highest levels of the memory hierarchy (e.g., elements that are not stored in a cache, an explicitly managed memory "scratchpad," etc.). Because the data needed by the set of instructions is not readily accessible, a memory stall condition occurs while the set of instructions waits for the memory elements to be loaded in the memory hierarchy. As will be seen in FIG. 2, profiling is used to analyze and collect data regarding the program in order to identify sets of instructions that include delinquent code that waits for memory elements to load. If the first set of instructions does not include delinquent code, then decision 120 branches to "no" branch 122 bypassing steps used to prevent memory stalls and, at step 130, the first set of instructions is compiled to the main thread (e.g., a thread that will run on the primary processing element (PPE)).

On the other hand, if the first set of instructions includes delinquent code, then decision 120 branches to "yes" branch 124 whereupon, another determination is made as to whether additional instructions can be included to prevent the memory stall (decision 125). As known by those skilled in the art, sometimes a memory element can be "pre-loaded" into the high areas of the memory hierarchy so that the element is available, while in other situations the identity of the memory element may not be known in time, resulting in an inevitable memory stall, unless the memory element just happens to be in the cache or the high area of the memory hierarchy. If additional code cannot be ascertained to prevent the memory stall condition, then decision 125 branches to "no" branch 128 whereupon, at step 130, the first set of instructions is compiled to the main thread (e.g., a thread that will run on the primary processing element (PPE)). On the other hand, if additional code can be used to prevent the memory stall, then decision 125 branches to "yes" branch 132 whereupon, at step 135, the processing requirements corresponding to the first set of instructions is analyzed in order to determine what type of processing core should execute the set of instructions. In the case where a memory stall is being prevented, an additional thread (on either the Primary Processing Element (PPE) or Secondary Processing Element (SPE) is generated to fetch or use the memory element. The additional thread is then executed at a time before the set of instructions where the memory stall occurred is executed. For example, if a set of instructions in a main thread running on the PPE is predicted (for example, by analysis of a profile) to experience a memory stall, one or more instructions is inserted in the main thread to call a second thread. The second thread executes on either the PPE or SPE and operates to fetch the needed memory element. Now, when the set of instructions that encountered the memory stall is executed, the stall condition no longer occurs because the needed memory element was pre-fetched a second thread running, e.g., on the SPE.

Based on the analysis of the requirements for the set of instructions at step 135, a determination is made at decision 140 as to whether to generate code to run on a first processor type (e.g., a PPE running a first instruction set architecture (ISA) or on an SPE running a second ISA). If the analysis reveals that the set of instructions should be executed on the SPE, then decision 140 branches to "yes" branch 142 whereupon, at step 145, code that is generated using the instruction set utilized by the SPE and the SPE object code is stored in SPE object code file 150. At step 165, code that is used to initiate the SPE thread (object code) is inserted into the main thread (e.g., the PPE object code) at a point where the data will likely be fetched and available before it is referenced by the set of instructions in the main thread. The main thread, with the inserted instructions used to execute the SPE object code, is stored in main PPE thread 170.

Returning to decision 140, if the analysis reveals that the code should execute on the PPE, then decision 140 branches to "no" branch 152 whereupon, at step 155 code that is generated using the instruction set utilized by the PPE and the additional PPE object code (thread) is stored in extra PPE threads 160. Now, at step 165, code that is used to initiate the extra PPE thread (object code) is inserted into the main thread (e.g., the PPE main thread) at a point where the data will likely be fetched and available before it is referenced by the set of instructions in the main thread. The main thread, with the inserted instructions used to execute the PPE object code, is stored in main PPE thread 170.

A determination is made as to whether there are additional instruction sets to process (decision 175). If there are additional instruction sets to process, decision 175 branches to "yes" branch 180 whereupon, at step 185, the next set of instructions is retrieved from source code 110 and analyzed before looping back to process the newly selected set of instructions (determine if the newly selected set of instructions is suitable for speculative execution, determine if the newly selected set of instructions includes delinquent instructions, etc.). This looping continues until there are no more instructions to process, at which point decision 175 branches to "no" branch 190 and processing ends at 195.

Figure 2:
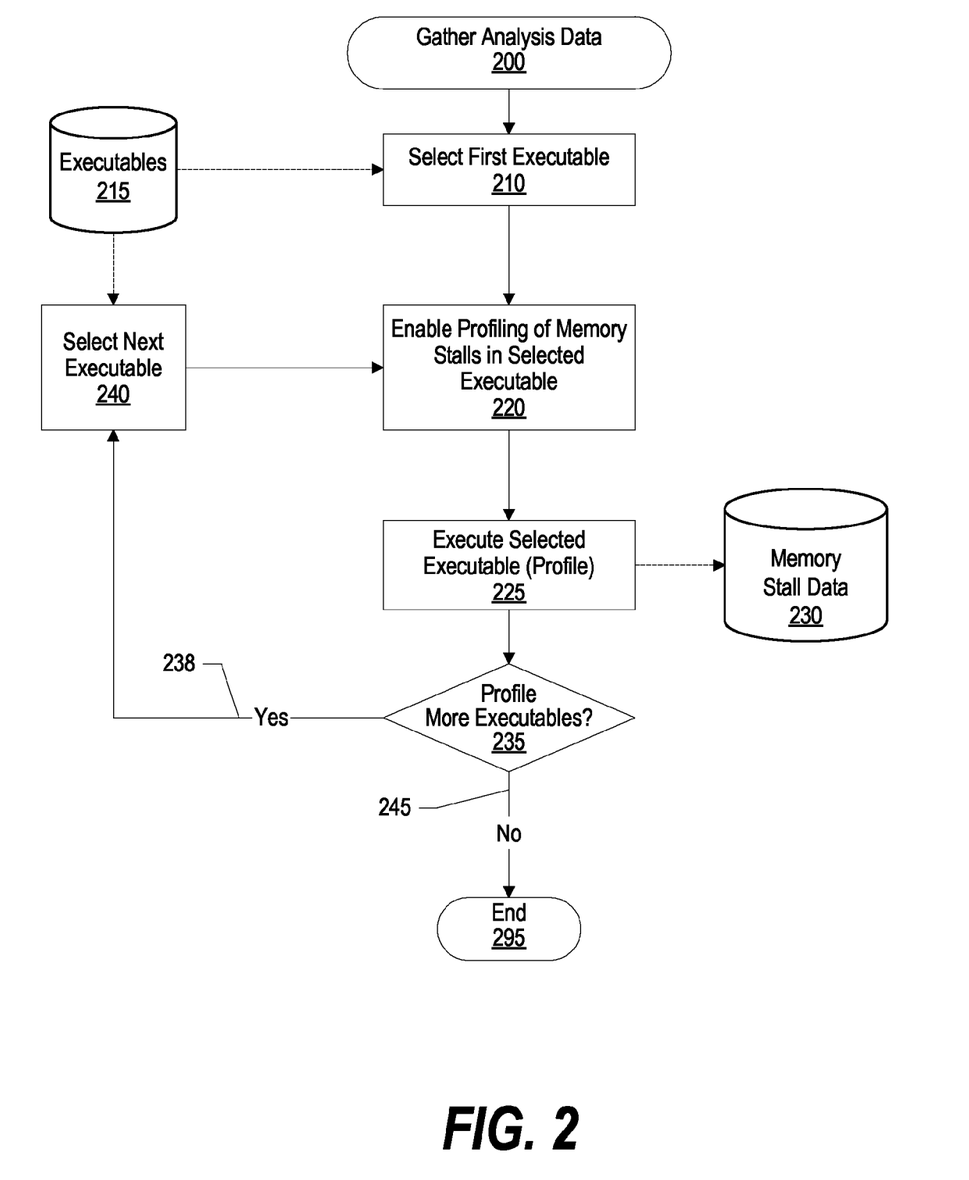
FIG. 2 is a flowchart showing steps to gather analysis data used by the compiler to identify code for speculative execution.

FIG. 2 is a flowchart showing steps to gather analysis data used by the compiler to identify code for speculative execution. Processing commences at 200 whereupon, at step 210 the first executable is selected from executables data store 215. An example of an executable would be the main thread processed in FIG. 1 to address speculative execution issues and reduce memory stalls. However, the executables processed in FIG. 2 have not yet been processed by the steps shown in FIG. 1. An example executable, therefore, would be a single-threaded application without speculative assist code. Returning to the steps shown in FIG. 2, at step 220, profiling of memory stalls in the selected executable is enabled. After profiling has been enabled, at step 225, the executable is executed and profile data is gathered related to memory stalls that occur in the executable. The memory stall data is stored in memory stall data store 230. A determination is made as to whether there are more executables to profile (decision 235). If there are additional executables to profile, decision 235 branches to "yes" branch 238 whereupon, at step 240, the next executable for profiling is selected and processing loops back to profile the newly selected executable. This looping continues until all desired executables have been profiled, at which point decision 235 branches to "no" branch 245 and processing thereafter ends at 295.

Figure 3:
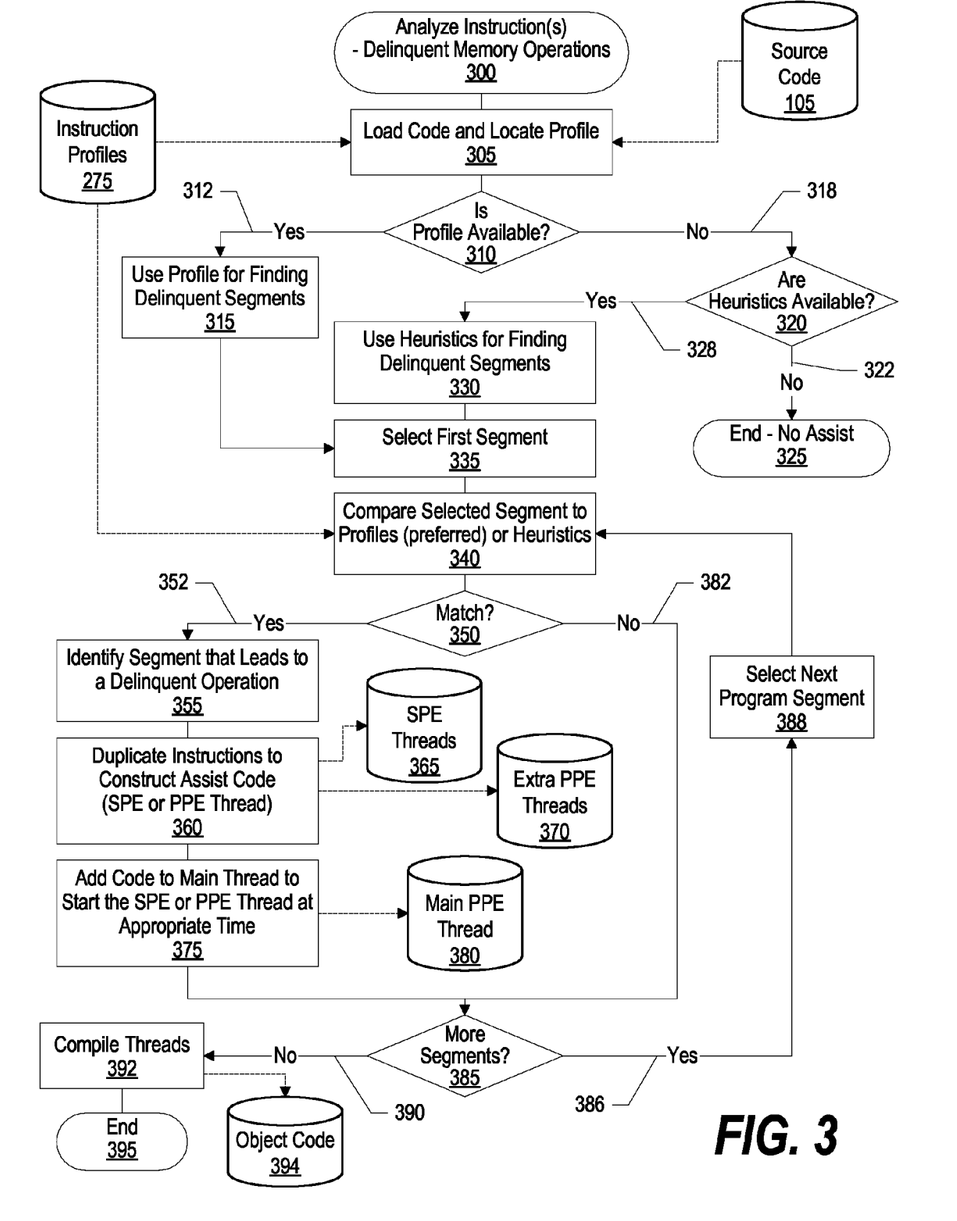
FIG. 3 is a flowchart showing steps taken to analyze instructions to identify code with delinquent memory operations.

FIG. 3 is a flowchart showing steps taken to analyze instructions to identify code with delinquent memory operations. The steps shown in FIG. 3 operate to match sets of instructions included in a source code file with profiled instructions that were identified and generated using the steps shown in FIG. 2. Processing of FIG. 3 commences at 300 whereupon, at step 305, source code 105 which includes one or more sets of instructions is loaded and instruction profiles 275 are read to determine if the source code instructions have been profiled. A determination is made as to whether the source code has been profiled (decision 310). If the source code has been profiled, decision 310 branches to "yes" branch 312 whereupon, at step 315, the instruction profiles are used to find delinquent code segments (sets of instructions) included in source code 105. On the other hand, if the source code has not been profiled, decision 310 branches to "no" branch 318 whereupon another determination is made as to whether heuristics are available for finding delinquent code segments within source code 105 (decision 320). If heuristics are not available, then decision 320 branches to "no" branch 322 and processing ends at 325 without providing speculative assistance for delinquent instructions. On the other hand, if heuristics are available, decision 320 branches to "yes" branch 328 whereupon, at step 330, the heuristics are used to find code segments that are likely to be delinquent. Because the instruction profiles uses actual data resulting from profiling the actual thread (e.g., program), the instruction profiles are generally preferred over heuristics.

At step 335 the first set of instructions is selected (retrieved) from source code 105. At step 340, the selected set of instructions is compared to instruction profiles or heuristics, depending on whether instruction profiles or heuristics are being used. A determination is made as to whether the selected set of instructions matches an instruction profile or a heuristic (decision 350). If the selected set of instructions matches, then decision 350 branches to "yes" branch 352 whereupon, at step 355, the code segment that leads to the delinquent instruction is identified. For example, if the delinquent instruction is a comparator and one of the values being used by the comparator is loaded in a previous instruction, then the identified code segment would be the load instruction. At step 360, duplicate instructions are used to generate the thread assist code for one of the processor types (e.g., PPE or SPE) included in the heterogeneous processing environment. The duplicate instructions added as a separate thread and included in either SPE threads data store 365 (if the thread assist will be executed by the SPE) or the extra PPE threads data store 370 (if the thread assist will be executed by the PPE). In addition, the thread assist code can be added as a separate thread for both of the processor types (e.g., an SPE thread that performs the LOAD instruction from the SPE processor and a PPE thread that performs the LOAD instruction from the PPE processor).

At step 375, instructions are added to the main processing thread (380) in order to execute the thread assist code stored as either an SPE thread or a PPE thread (or both) at an appropriate time before the data is needed by the instruction that was identified as being delinquent. A determination is made as to whether there are more segments (sets of instructions) to process (decision 385). If there are more segments to process, decision 385 branches to "yes" branch 386 whereupon, at step 388, the next segment (set of instructions) is selected and processing loops back to determine if the newly selected segment matches any instruction profile or heuristic. This looping continues until there are no more segments to process, at which point decision 385 branches to "no" branch 392 whereupon, at step 392, the threads (SPE Threads 365, Extra PPE Threads 370, and Main Thread 380) are compiled and stored as object code in nonvolatile storage area 394. Processing thereafter ends at 395.

Figure 4:
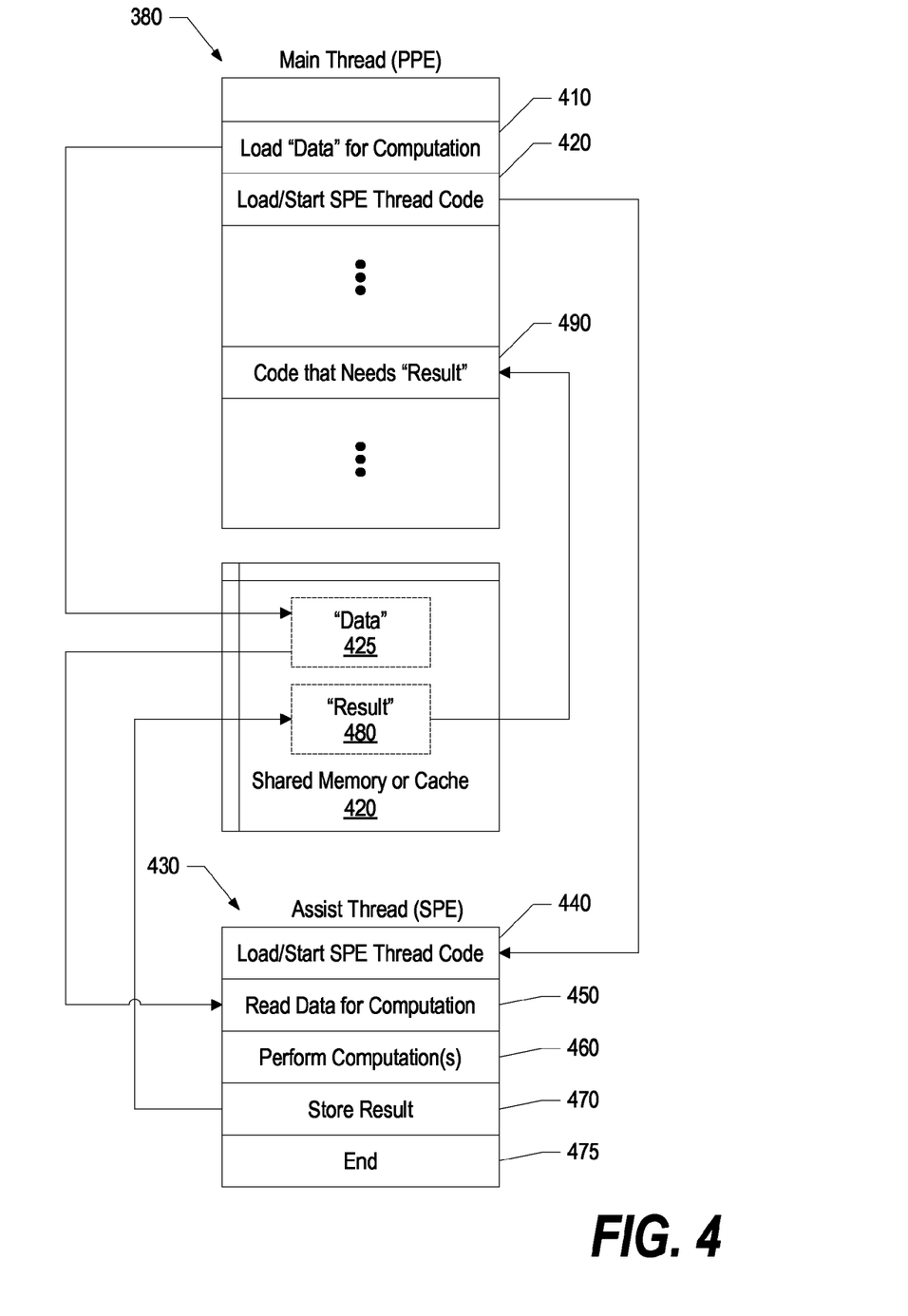
FIG. 4 is a diagram showing a main thread speculatively executing code on a different processor core in order to prepare data that will be needed by the main thread.

FIG. 4 is a diagram showing a main thread speculatively executing code on a different processor core in order to prepare data that will be needed by the main thread. In this example, main thread 380 is being executed by the PPE. At instruction 410, some data is loaded that is needed for a particular computation. Data 425 is stored in a shared memory area 420 that is accessible by the heterogeneous processors (i.e., by the PPE and the SPEs). At instruction 420, the main thread executes one or more instructions that initiates an assist thread 430 that runs on one of the SPEs.

SPE assist thread starts executing in one of the SPEs at instruction 440. At instruction 450, the SPE assist thread reads data 425 from shared memory 420. At instruction 460, the SPE assist thread performs some calculations using the data. The calculations may be complex calculations or something as simple as loading data into a high area in the memory hierarchy so that the data ("result") is readily available to the main thread. At instruction 470, the SPE assist thread stores the result(s) back to the shared memory (result 480), and SPE assist thread processing ends at 475.

Returning to main thread processing, at some point after initiating the SPE assist thread, the main thread will execute instruction(s) 490 that need the resulting data provided by the SPE assist thread. If the compiler inserted the invocation of the assist thread (instruction(s) 420) far enough before instruction 490, then the resulting data 480 should be ready and available in the high area of the memory hierarchy (e.g., in the data cache), so the main thread will likely not stall waiting for the result to load.

Figure 5:
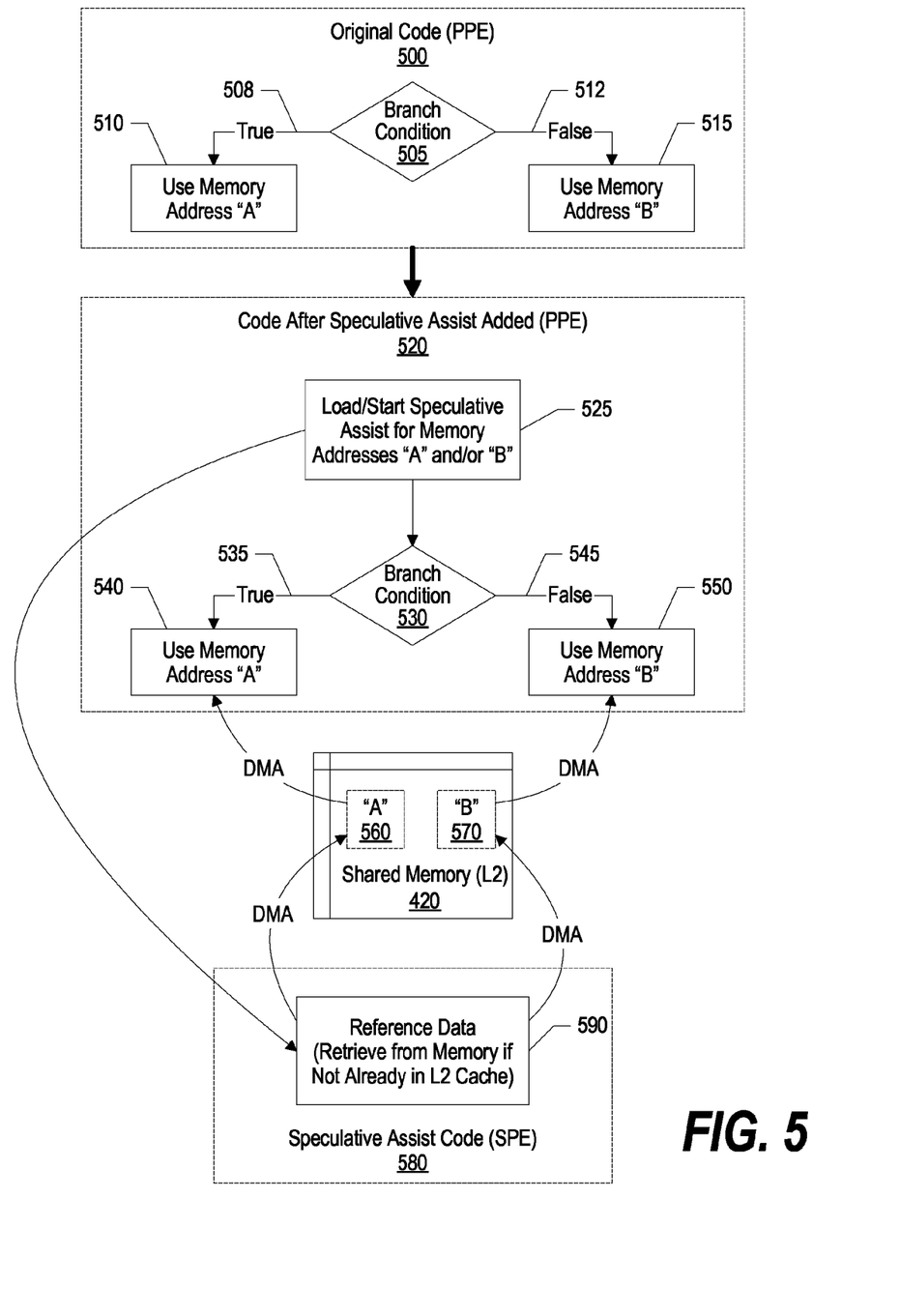
FIG. 5 is a diagram showing the effect of speculative assistance being provided to the handling of a branch instruction.

FIG. 5 is a diagram showing the effect of speculative assistance being provided to the handling of a branch instruction. Flowchart segment 500 shows the logic of the original main thread before speculative assistance was provided by the compiler. In flowchart segment 500, branch condition 505 branches to "true" branch 508 if the condition is true and "false" branch 512 if the condition is false. As shown, if the condition is true, at step 510, memory element "A" is used, while if the condition is false, at step 515, memory element "B" is used.

Flowchart segment 520 depicts the logic after the compiler provides speculative assistance to one or both sides of the branch condition. The compiler inserts one or more instructions to load and start speculative assistance thread(s) that will pre-fetch memory elements ("A" and/or "B") before they are needed by the main thread. Step 525 initiates speculative assist code 580. In the example shown, speculative assist code 580 is running in an SPE while the main thread is running in the PPE. Speculative assist code 580 operates to reference data elements needed (step 590). In other words, speculative assist code 580 retrieves the data elements from a lower level of the memory hierarchy and the memory elements are stored in a high level of the memory hierarchy (e.g., an L2 cache). In one embodiment, the SPEs read and write data to shared memory 420 using direct memory access (DMA) instructions. Therefore, the speculative assist code running in the SPE uses DMA instructions to write memory elements "A" (560) and/or "B" (570) to shared memory 420 (e.g., the L2 cache). Now, returning to the main thread, when the same branch condition, branches, and steps (505, 508, 512, 510, and 515) are performed, the memory elements pre-fetched by speculative assist code 580 is already at the highest level of the memory hierarchy and the main thread does not stall or otherwise wait for the memory elements to be loaded.

Figure 6:
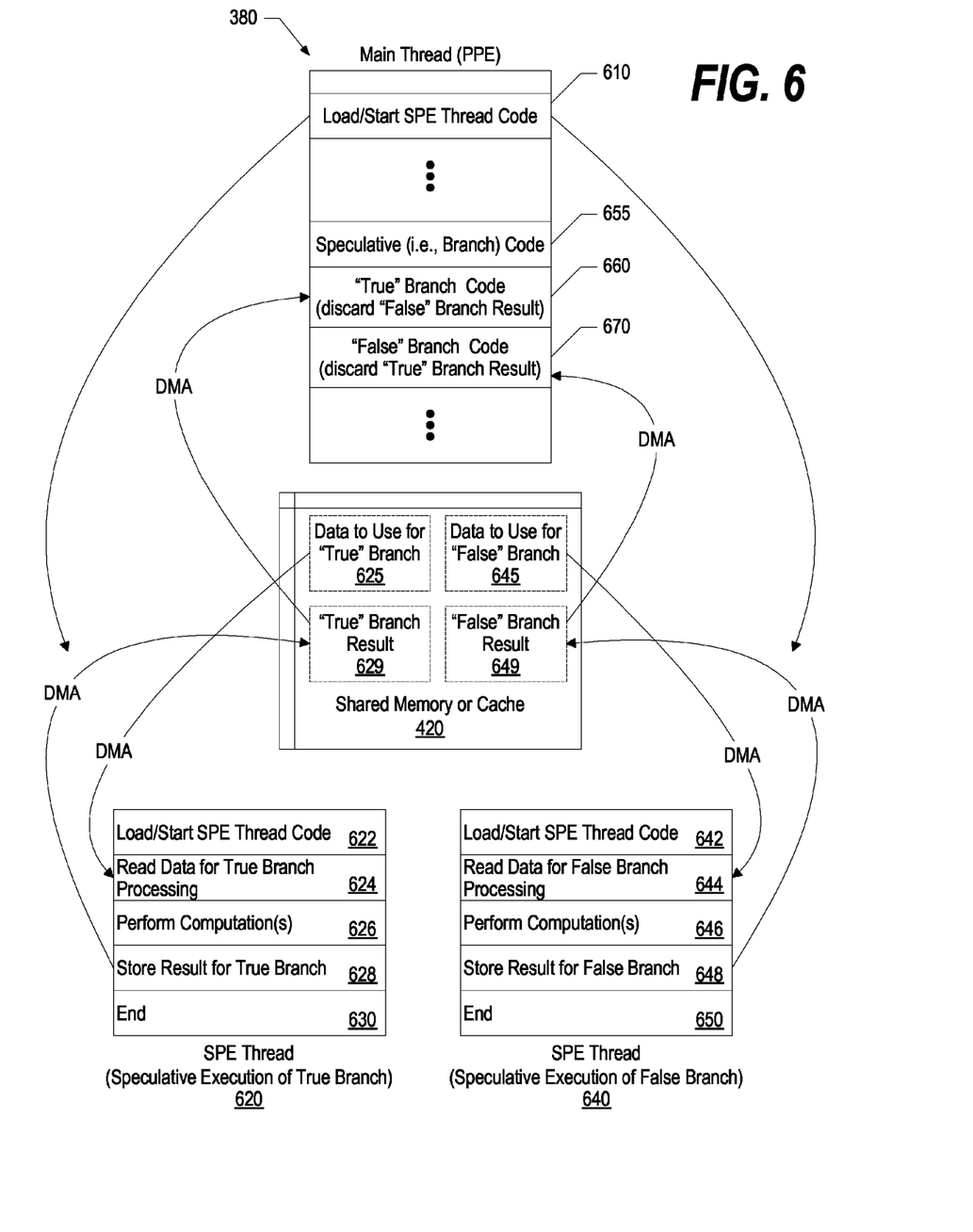
FIG. 6 is another diagram showing a main thread executing with speculative assistance being provided to the handling of a branch instruction.

FIG. 6 is another diagram showing a main thread executing with speculative assistance being provided to the handling of a branch instruction. In contrast to the example shown in FIG. 5 where the speculative assist code was simply used to pre-fetch memory elements, in FIG. 6, the speculative assist code is used to perform processing. For example in a video game where a player is walking down a hallway and can either turn right or left, the speculative assist code shown in FIG. 6 can be used to preload the graphics needed to display regardless of whether the user of the game makes the player turn right or left. In this example, main thread 380 is again shown running on the PPE. At instruction 610, the main thread initiates execution of speculative assistance threads that run on SPEs. Here, SPE speculative assist thread 620 runs on one SPE and SPE speculative assist thread 640 runs on another SPE. In another embodiment, one SPE thread could pre-fetch the graphics used for both the "right" and "left" turns made by the user. In addition, before initiating the SPE assist threads, main thread executes instructions 605 which load addresses or other data used by the speculative assist threads to preload the graphics. In this case, memory elements 625 include data to use to process the "true" branch (e.g., when the user turns "right"), and memory elements 645 include data to use to process the "false" branch (e.g., when the user turns "left").

The speculative assist threads, 620 and 640, are started at 622 and 642, respectively. At respective steps 624 and 644, the speculative assist threads read the data elements used for the "true" (e.g., user turning right) and "false" (e.g., user turning left) conditions. At steps 626 and 646, respectively, the speculative assist threads perform computations used to preload the respective graphics and, at steps 628 and 648, the speculative assist threads use DMA instructions to write the resulting data to shared memory 420 (results 629 and 649, respectively). The speculative assist threads thereafter end at 630 and 650, respectively. Now, returning to main thread processing, at some point after the speculative assist threads are initiated, the branch instruction is reached (655). If the condition is "true" (e.g., the user turned "right"), then, at instruction 660, the "true" branch results (629) are used (e.g., graphics of the right hallway). Likewise, if the condition is "false" (e.g., the user turned "left"), then, at instruction 670, the "false" branch results (649) are used (e.g., graphics of the left hallway). In this manner, the heterogeneous processing environment can be used to pre-fetch memory elements as well as pre-calculate results that might be needed depending upon the conditions encountered in the main thread.

Figure 7:
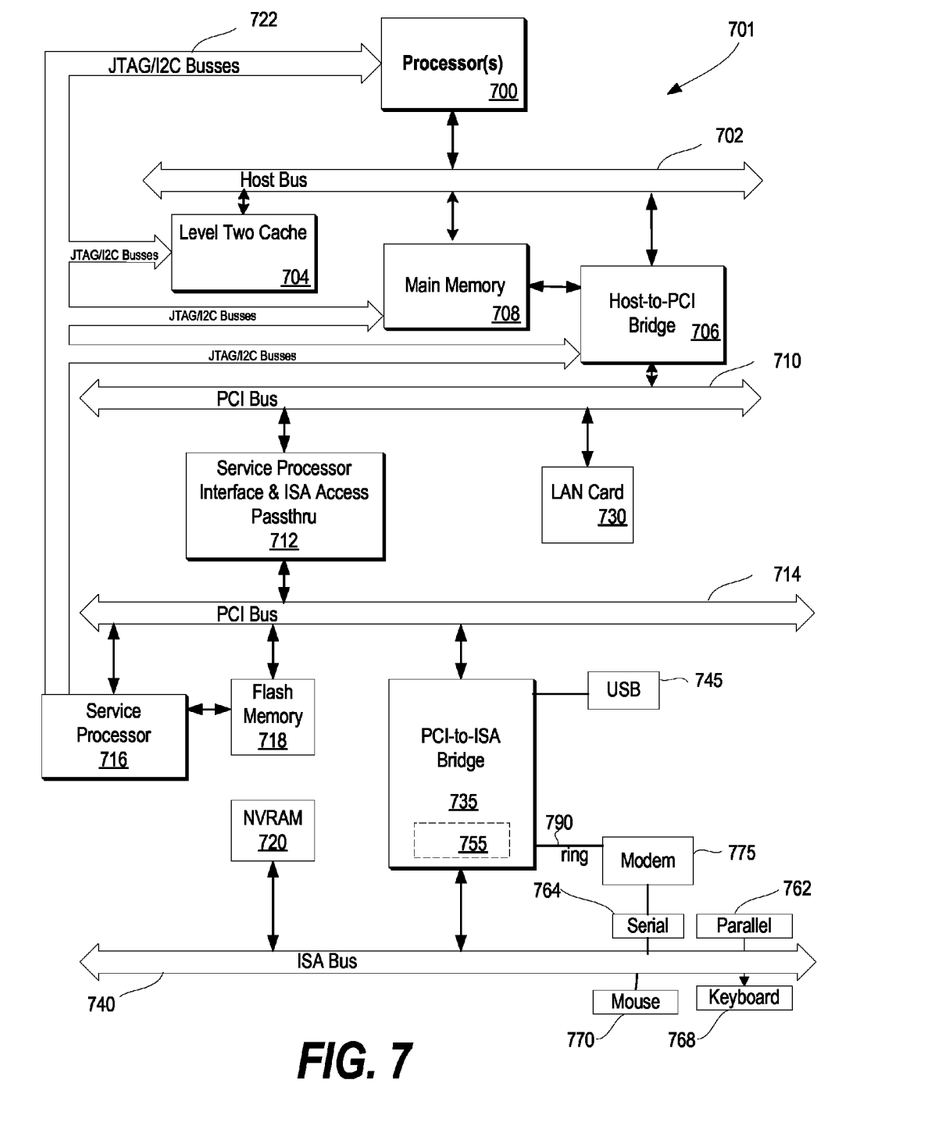
FIG. 7 is a block diagram of a traditional information handling system in which the present invention can be implemented.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

Figure 8:
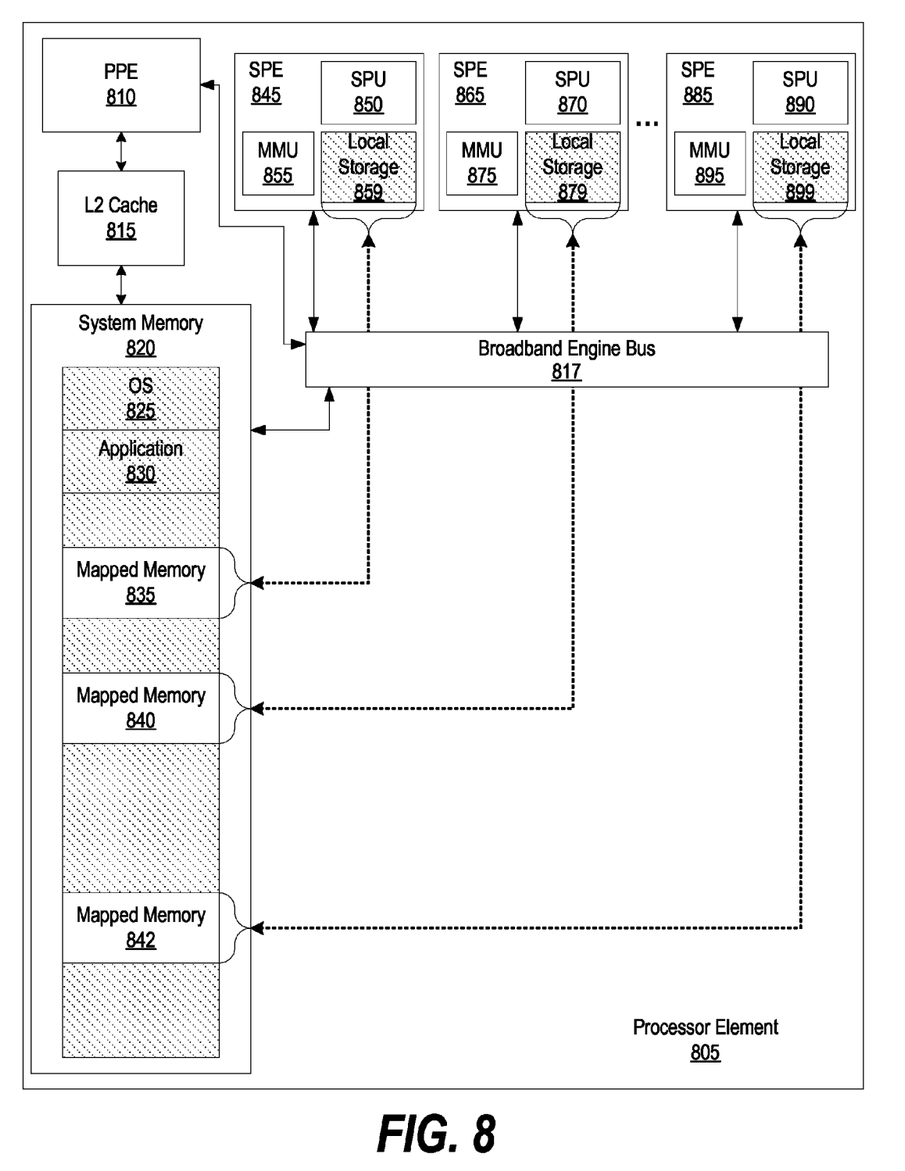
FIG. 8 is a block diagram of a broadband engine that includes a plurality of heterogeneous processor cores in which the present invention can be implemented.

FIG. 8 is a block diagram illustrating a processing element having a main processor and a plurality of secondary processors (The SPE is an example of a particular type of secondary processor) sharing a system memory. FIG. 8 depicts a heterogeneous processing environment that can be used to implement the present invention. Primary Processor Element (PPE) 805 includes processing unit (PU) 810, which, in one embodiment, acts as the main processor and runs an operating system. Processing unit 810 may be, for example, a Power PC core executing a Linux operating system. PPE 805 also includes a plurality of synergistic processing elements (SPEs) such as SPEs 845, 865, and 885. The SPEs include synergistic processing units (SPUs) that act as secondary processing units to PU 810, a memory storage unit, and local storage. For example, SPE 845 includes SPU 860, MMU 855, and local storage 859; SPE 865 includes SPU 870, MMU 875, and local storage 879; and SPE 885 includes SPU 890, MMU 895, and local storage 899.

All SPEs may use the same ISA, or may each implement an application specific ISA. Each SPE may be configured to perform a different task, and accordingly, in one embodiment, each SPE may be accessed using different instruction sets. If PPE 805 is being used in a wireless communications system, for example, each SPE may be responsible for separate processing tasks, such as modulation, chip rate processing, encoding, network interfacing, etc. In another embodiment, the SPEs may have identical instruction sets and may be used in parallel with each other to perform operations benefiting from parallel processing.

PPE 805 may also include level 2 cache, such as L2 cache 815, for the use of PU 810. In addition, PPE 805 includes system memory 820, which is shared between PU 810 and the SPUs. System memory 820 may store, for example, an image of the running operating system (which may include the kernel), device drivers, I/O configuration, etc., executing applications, as well as other data. System memory 820 includes the local storage units of one or more of the SPEs, which are mapped to a region of system memory 820. For example, local storage 859 may be mapped to mapped region 835, local storage 879 may be mapped to mapped region 840, and local storage 899 may be mapped to mapped region 842. PU 810 and the SPEs communicate with each other and system memory 820 through bus 817 that is configured to pass data between these devices.

The MMUs are responsible for transferring data between an SPU's local store and the system memory. In one embodiment, an MMU includes a direct memory access (DMA) controller configured to perform this function. PU 810 may program the MMUs to control which memory regions are available to each of the MMUs. By changing the mapping available to each of the MMUs, the PU may control which SPU has access to which region of system memory 820. In this manner, the PU may, for example, designate regions of the system memory as private for the exclusive use of a particular SPU. In one embodiment, the SPUs' local stores may be accessed by PU 810 as well as by the other SPUs using the memory map. In one embodiment, PU 810 manages the memory map for the common system memory 820 for all the SPUs. The memory map table may include PU 810's L2 Cache 815, system memory 820, as well as the SPUs' shared local stores.

In one embodiment, the SPUs process data under the control of PU 810. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 810 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method to provide speculative assistance to a thread in a heterogeneous processing environment, the method comprising:
   compiling a source code into a first executable representation, wherein the source code comprises a plurality of instructions;
   enabling profiling of memory stalls in the first executable representation;
   executing the first executable representation in response to enabling the profiling;
   storing memory stall data related to the first executable representation;
   in response to the storing, identifying a first set of instructions included in the source code, wherein the identified first set of instructions is delinquent code, and wherein the identifying is based on the stored memory stall data;
   in further response to the storing, identifying a second set of instructions included in the source code, wherein the second set of instructions is needed to prevent a stall of the identified first set of instructions;
   analyzing processing requirements for the identified second set of instructions, wherein the analyzing is based on one or more processing facilities used to execute the identified second set of instructions;
   determining a processor type to execute the identified second set of instructions based on the analysis, wherein the processor type is selected from a plurality of processor types included in the heterogeneous processing environment, the heterogeneous processing environment including a plurality of heterogeneous processing cores in a single silicon substrate, and wherein a first type of processing core included in the heterogeneous processing cores uses a first instruction set and wherein a second type of processing core included in the heterogeneous processing cores uses a second instruction set; and
   generating a second object code representation for the identified second set of instructions, wherein the second object code representation is adapted to execute on the determined processor type.

2. The method of claim 1 further comprising:
   generating a first object code representation corresponding to the first set of instructions.

3. The method of claim 2 further comprising:
   including the first object code representation in a main object code representation that corresponds to the thread; and
   inserting one or more instructions in the main object code representation, wherein the inserted instructions execute before the first object code representation, and wherein the one or more inserted instructions execute the second object code representation.

4. The method of claim 3 wherein the processor type that executes the main object code representation is different than the processor type that executes the second object code representation.

5. The method of claim 1 further comprising:
   identifying a delinquent load instruction in the stored memory stall data; and
   generating and storing an instruction profile to handle the identified delinquent load.

6. The method of claim 5 further comprising,
   matching the stored instruction profile to one or more instruction sets included in the source code;
   in response to a successful match, identifying the second set of instructions, wherein the second set of instructions lead to at least one of the instruction sets that matched the stored instruction profile;
   generating a second thread of instructions that includes a third set of instructions that perform functions of the identified first second set of instructions; and
   inserting one or more instructions in the thread at a position before the matched sets of instructions, wherein the inserted instructions executes the generated second thread.

7. The method of claim 6 wherein the thread executes on one of the heterogeneous processing cores that uses the first instruction set and wherein the second thread executes on another of the heterogeneous processing cores that uses the second instruction set.

8. An information handling system comprising:
   a plurality of heterogeneous processing cores in a single silicon substrate, wherein a first processor type of one or more of the heterogeneous processing cores utilizes a first instruction set architecture (ISA), and wherein a second processor type of one or more of the heterogeneous processing cores utilizes a second instruction set architecture (ISA);
   a local memory corresponding to each of the plurality of heterogeneous processors;
   a shared memory accessible by the heterogeneous processors;
   one or more nonvolatile storage devices accessible by at least one of the heterogeneous processors; and
   a group of instructions stored in one of the local memories, wherein one or more of the heterogeneous processors executes the group of instructions in order to perform actions of:
      compiling a source code into a first executable representation;
      enabling profiling of memory stalls in the first executable representation;
      executing the first executable representation in response to enabling the profiling;
      storing memory stall data related to the first executable representation;
      in response to the storing, identifying a first set of instructions included in a source code representation, wherein the identified first set of instructions is delinquent code, and
      wherein the identifying is based on the stored memory stall data;
      in further response to the storing, identifying a second set of instructions included in the source code, wherein the second set of instructions is needed to prevent a stall of the identified first set of instructions;
      analyzing processing requirements for the identified second set of instructions, wherein the analyzing is based on one or more processing facilities used to execute the identified second set of instructions;
      determining the processor type to execute the identified second set of instructions based on the analysis, wherein the processor type is selected from the first and the second processor types; and
      generating a second object code representation for the identified second set of instructions, wherein the second object code representation is adapted to execute on the determined processor type.

9. The information handling system of claim 8 wherein the group of instructions further perform actions comprising:
generating a first object code representation corresponding to the first set of instructions.

10. The information handling system of claim 9 wherein the group of instructions further perform actions comprising:
including the first object code representation in a main object code representation that corresponds to the thread; and
inserting one or more instructions in the main object code representation, wherein the inserted instructions execute before the first object code representation, and wherein the one or more inserted instructions execute the second object code representation.

11. The information handling system of claim 10 wherein the processor type that executes the main object code representation is different than the processor type that executes the second object code representation.

12. The information handling system of claim 8 wherein the group of instructions further perform actions comprising:
identifying a delinquent load instruction in the stored memory stall data; and
generating and storing an instruction profile to handle the identified delinquent load.

13. The information handling system of claim 12 wherein the group of instructions further perform actions comprising:
matching the stored instruction profile to one or more instruction sets included in the source code;
in response to a successful match, identifying the second set of instructions, wherein the second set of instructions lead to at least one of the instruction sets that matched the stored instruction profile;
generating a second thread of instructions that includes a third set of instructions that perform functions of the identified second set of instructions;
inserting one or more instructions in the thread at a position before the matched sets of instructions, wherein the inserted instructions executes the generated second thread.

14. A computer program product stored in a non-transitory computer readable medium, comprising functional descriptive material that, when executed by an information handling system, causes the information handling system to perform actions that include:
compiling a source code into a first executable representation;
enabling profiling of memory stalls in the first executable representation;
executing the first executable representation after enabling the profiling;
storing memory stall data related to the first executable representation;
in response to the storing, identifying a first set of instructions included in the source code representation, wherein the identified first set of instructions is delinquent code, and wherein the identifying is based on the stored memory stall data;
in further response to the storing, identifying a second set of instructions included in the source code, wherein the second set of instructions is needed to prevent a stall of the identified first set of instructions;
analyzing processing requirements for the identified first second set of instructions, wherein the analyzing is based on one or more processing facilities used to execute the identified second set of instructions;
determining a processor type to execute the identified second set of instructions based on the analysis, wherein the processor type is selected from a plurality of processor types included in the heterogeneous processing environment, the heterogeneous processing environment including a plurality of heterogeneous processing cores in a single silicon substrate, and wherein a first type of processing core included in the heterogeneous processing cores uses a first instruction set and wherein a second type of processing core included in the heterogeneous processing cores uses a second instruction set; and
generating a second object code representation for the identified second set of instructions, wherein the second object code representation is adapted to execute on the determined processor type.

15. The computer program product of claim 14 wherein the functional descriptive material causes the information handling system to perform additional actions comprising:
generating a first object code representation corresponding to the first set of instructions.

16. The computer program product of claim 15 wherein the functional descriptive material causes the information handling system to perform additional actions comprising:
including the first object code representation in a main object code representation that corresponds to the thread; and
inserting one or more instructions in the main object code representation, wherein the inserted instructions execute before the first object code representation, and wherein the one or more inserted instructions execute the second object code representation.

17. The computer program product of claim 16 wherein the processor type that executes the main object code representation is different than the processor type that executes the second object code representation.

18. The computer program product of claim 14 wherein the functional descriptive material causes the information handling system to perform additional actions comprising:
identifying a delinquent load instruction in the stored memory stall data; and
generating and storing an instruction profile to handle the identified delinquent load.

19. The computer program product of claim 18 wherein the functional descriptive material causes the information handling system to perform additional actions comprising:
matching the stored instruction profile to one or more instruction sets included in the source code;
in response to a successful match, identifying the second set of instructions, wherein the second set of instructions lead to at least one of the instruction sets that matched the stored instruction profile;
generating a second thread of instructions that includes a third set of instructions that perform functions of the identified second set of instructions; and
inserting one or more instructions in the thread at a position before the matched sets of instructions, wherein the inserted instructions executes the generated second thread.

20. The computer program product of claim 19 wherein the thread executes on one of the heterogeneous processing cores that uses the first instruction set and wherein the second thread executes on another of the heterogeneous processing cores that uses the second instruction set.

* * * * *